United States Patent
Lin et al.

(10) Patent No.: US 10,110,085 B2
(45) Date of Patent: Oct. 23, 2018

(54) MOTOR AND FAN USING THE SAME

(75) Inventors: Cheng-Huang Lin, Taoyuan Hsien (TW); Yung-Yu Chiu, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 772 days.

(21) Appl. No.: 13/241,320

(22) Filed: Sep. 23, 2011

(65) Prior Publication Data
US 2012/0269666 A1    Oct. 25, 2012

(30) Foreign Application Priority Data

Apr. 20, 2011    (TW) .............................. 100113642 A

(51) Int. Cl.
| | | |
|---|---|---|
| H02K 5/08 | (2006.01) | |
| H02K 1/04 | (2006.01) | |
| H02K 3/44 | (2006.01) | |
| F04D 25/06 | (2006.01) | |
| H02K 11/30 | (2016.01) | |

(52) U.S. Cl.
CPC ............. *H02K 5/08* (2013.01); *F04D 25/064* (2013.01); *H02K 1/04* (2013.01); *H02K 3/44* (2013.01); *H02K 11/30* (2016.01); *H02K 2211/03* (2013.01)

(58) Field of Classification Search
CPC .. F04D 29/4226; F04D 19/002; F04D 19/005; F04D 29/4233; F04D 29/424; F04D 29/4246; F04D 29/4253; F04D 25/064; H02K 5/08; H02K 11/30; H02K 3/44; H02K 1/04; H02K 2211/03

USPC .............. 417/354, 423.7, 423.14; 360/98.01, 360/99.08; 310/43, 88, 154.44; 361/695
See application file for complete search history.

(56) References Cited

U.S. PATENT DOCUMENTS

| | | | | |
|---|---|---|---|---|
| 5,973,424 A | * | 10/1999 | Engelberger et al. | 310/43 |
| 6,075,304 A | * | 6/2000 | Nakatsuka | 310/216.137 |
| 6,158,985 A | * | 12/2000 | Watanabe et al. | 417/423.14 |
| 6,175,171 B1 | * | 1/2001 | Rupp et al. | 310/52 |
| 6,278,207 B1 | * | 8/2001 | Matsumoto | 310/88 |
| 6,888,279 B2 | * | 5/2005 | Haner | 310/166 |
| 7,443,071 B2 | * | 10/2008 | Tung et al. | 310/216.067 |
| 2004/0102597 A1 | * | 5/2004 | Tobita et al. | 528/44 |
| 2004/0145250 A1 | * | 7/2004 | Kudo | F04D 29/023 310/43 |
| 2006/0138877 A1 | * | 6/2006 | Akabane | 310/43 |
| 2007/0145842 A1 | * | 6/2007 | Zhu et al. | 310/88 |
| 2009/0081059 A1 | * | 3/2009 | Seki et al. | 417/420 |
| 2009/0185919 A1 | * | 7/2009 | Yoo et al. | 417/354 |
| 2011/0027075 A1 | * | 2/2011 | Nogami et al. | 415/182.1 |

\* cited by examiner

*Primary Examiner* — Peter J Bertheaud
*Assistant Examiner* — Dnyanesh Kasture
(74) *Attorney, Agent, or Firm* — CKC & Partners CO., Ltd.

(57) ABSTRACT

Disclosed herein are a motor and a fan using the same. The motor includes a chassis having a fillister, a stator assembly disposed at a central area of the chassis, a circuit element disposed in the fillister, a first resin material, and a second resin material. The first resin material is filled within the fillister and covers the circuit element. The second resin material covers a part of the stator assembly where is not joined with the chassis.

8 Claims, 3 Drawing Sheets

MOTOR AND FAN USING THE SAME

RELATED APPLICATIONS

This application claims priority to Taiwan Application Serial Number 100113642, filed on Apr. 20, 2011, which is herein incorporated by reference.

BACKGROUND

Field of Invention

The present invention relates to an electromagnetic device, and more particularly, to a motor and the fan using the same.

Description of Related Art

With advances in technology, consumers can select various kinds of multi-functional electronic products in the market. Electronic products are developed from single function toward multi-functions and highly integrated. Therefore, the size and weight of an electronic device has been increasingly demanded in the market, so that more components must be disposed within a limited space of the electronic device. As the density of the internal components and the integrated circuits of the electronic device increases, the heat generated within the electronic device becomes higher, so that the cooling mechanism is importantly highlighted.

In a general electronic product, a fan is commonly used to drive air for cooling the electronic product. For example, in notebooks, computers, desktop computers, or even chassis of servers, fans are used to dissipating heat generated from internal chipsets, hard drives, and other heat generating elements. Therefore, how to maintain the stability of operating and the life of the fan has become one of the major tasks in the industry.

However, current fans do not have any designs to protect the circuit elements (e.g. circuit boards, winding assembly, and etc.) from the damages caused by moisture or impurities, so that the stability of operating worsens and the life of the fans decreases. Especially being used in harsh environments such as high humidity and high salt conditions, the fans cannot meet the demanding durability requirements.

SUMMARY

Accordingly, it is an object to provide a motor and a fan using the same to solve the problems that the shortened life and the poor stability of operating of electronic elements caused by moisture and impurities.

An aspect of the invention is to provide a motor that includes a chassis, a stator assembly, a circuit element, a first resin material, and a second resin material. The chassis has a fillister. The stator assembly is disposed on the chassis and located at a central area of the chassis. The circuit element is disposed in the fillister. The first resin material is filled within the fillister and covers the circuit element. The second resin material covers a part of the stator assembly where is not joined with the chassis.

According to an embodiment of the invention, the motor further includes a shaft and a rotor assembly. The shaft passes through the stator assembly and is operatively connected to the chassis. The rotor assembly is pivotally sleeved to the stator assembly via the shaft.

According to an embodiment of the invention, the chassis has an outer round wall so as to define the fillister. The outer round wall has a round wall height along the axial direction of the shaft. The first resin material has a surface height along the axial direction of the shaft. The round wall height is larger than the surface height.

According to an embodiment of the invention, the round wall height is larger than the surface height, and the rotor assembly has a rotor frame wall surrounding the stator assembly. The rotor frame wall and the outer round wall are partially overlapped in the axial direction of the shaft.

According to an embodiment of the invention, the chassis has an outer round wall so as to define the fillister. The outer round wall has a round wall height along the axial direction of the shaft. The first resin material has a surface height along the axial direction of the shaft. The round wall height is equal to the surface height.

According to an embodiment of the invention, the stator assembly includes a plurality of silicon steel sheets, and the rotor assembly includes a plurality of magnetic elements. A clearance is between the silicon steel sheets and the magnetic elements. The second resin material covers the surface of the stator assembly for a thickness, and the thickness is smaller than the clearance.

According to an embodiment of the invention, the thickness is larger than or equal to 5 µm.

According to an embodiment of the invention, the stator assembly includes a plurality of silicon steel sheets and a plurality of coils. The second resin material covers the surface of the stator assembly for a thickness, and the thickness is larger than or equal to 5 µm.

According to an embodiment of the invention, the first resin material is filled within the fillister by potting and hardening.

According to an embodiment of the invention, the first resin material is silicon resin, epoxy resin, or polyurethane rubber.

According to an embodiment of the invention, the second resin material is formed on the surface of the stator assembly by conformal coating.

According to an embodiment of the invention, the second resin material is acrylic, epoxy resin, or urethane.

According to an embodiment of the invention, the circuit element comprises a circuit board, and the circuit board is electrically connected to the stator assembly.

Another aspect of the invention is to provide a fan that includes a chassis, a stator assembly, a circuit element, a shaft, a rotor assembly, a first resin material, and a second resin material. The chassis has a fillister. The stator assembly is disposed on the chassis and located at a central area of the chassis. The circuit element is disposed in the fillister and electrically connected to the stator assembly. The shaft passes through the stator assembly and is operatically connected to the chassis. The rotor assembly is pivotally sleeved to the stator assembly via the shaft. The rotor assembly includes a plurality of blades. When the rotor assembly rotates relative to the stator assembly, the blades drive air to flow. The first resin material is filled within the fillister and covers the circuit element. The second resin material covers a part of the stator assembly where is not joined with the chassis.

According to an embodiment of the invention, the first resin material is filled within the fillister by potting and hardening.

According to an embodiment of the invention, the first resin material is silicon resin, epoxy resin, or polyurethane rubber.

According to an embodiment of the invention, the second resin material is formed on the surface of the stator assembly by conformal coating.

According to an embodiment of the invention, the second resin material is acrylic, epoxy resin, or urethane.

According to an embodiment of the invention, the circuit element comprises a circuit board, and the circuit board is electrically connected to the stator assembly.

According to the embodiments of the invention, the motor and the fan using the same can improve the life of the circuit element and prevent the stator assembly from erosion that causes the problem of worsening quality. Besides, the motor and the fan using the same can prevent impurities from entering the inner part of the motor, so as to ensure the stability of operating and the quality.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

According to embodiments of the invention, the motor and the fan using the same entirely cover the circuit element by the first resin material and encapsulate the surface of the stator assembly by the second resin material to improve the properties of water-proof and anti-salt, so as to further improve durability of the product.

Figure 1:
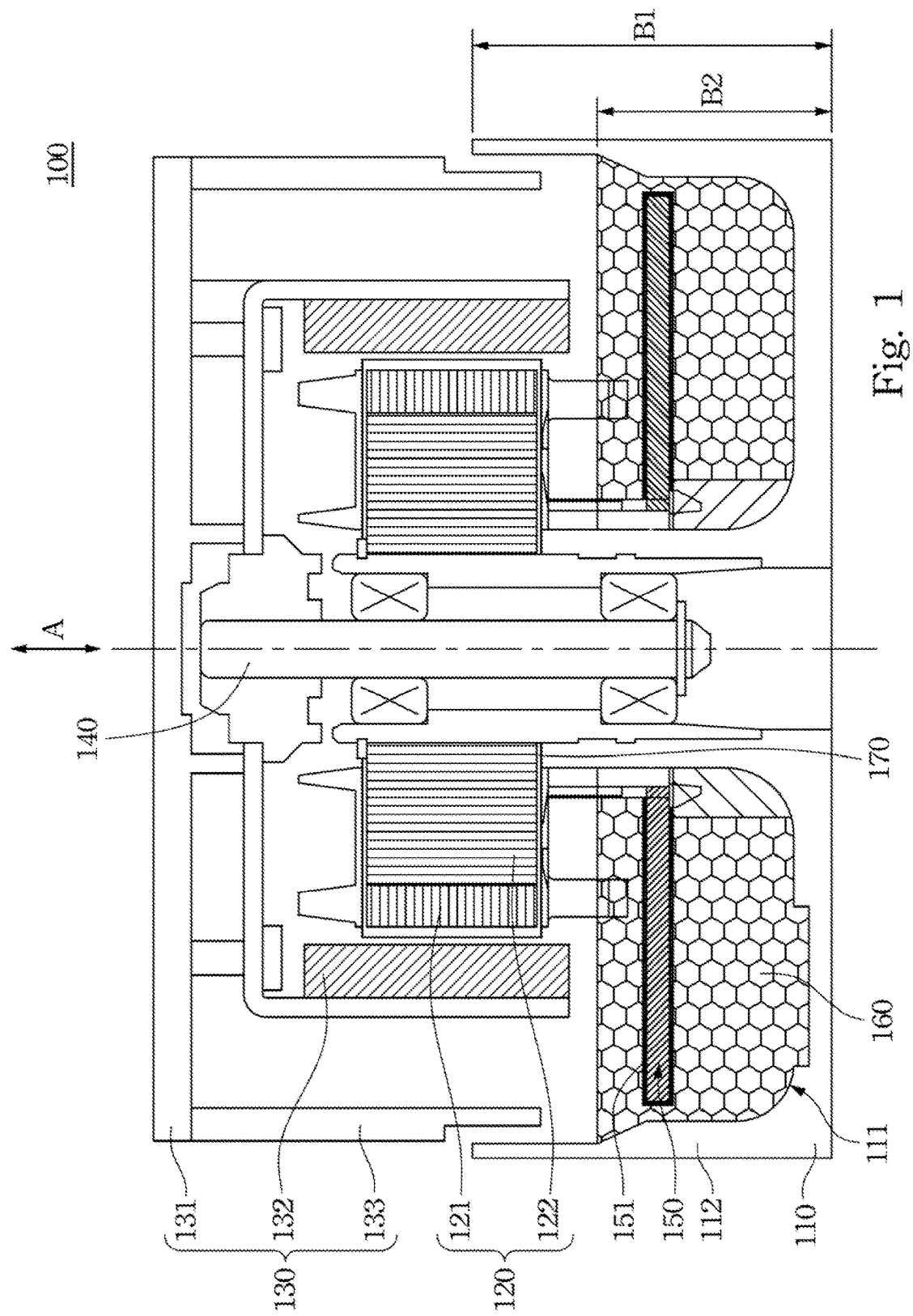
FIG. 1 is a sectional view showing a motor according to an embodiment of the invention.

Please refer to FIG. 1, which illustrates a sectional view showing a motor according to an embodiment of the invention. The motor 100 includes a chassis 110, a stator assembly 120, a circuit element 150, a first resin material 160, and a second resin material 170. The chassis 110 has a fillister 111. The circuit element 150 is disposed in the fillister 111. The stator assembly 120 is disposed on the chassis 110 and located at a central area of the chassis 110. The first resin material 160 is filled within the fillister 111 and covers the circuit element 150. In the embodiment, the first resin material 160 entirely covers the circuit element 150. The second resin material 170 covers a part of the stator assembly 120 where is not joined with the chassis 110.

In the motor 100 of the embodiment, the first resin material 160 is filled within the fillister 111 by potting and hardening. Firstly, the first resin material 160 is potted into the fillister 111 to entirely cover the circuit element 150. And then, the potted first resin material 160 is hardened. For example, after the first resin material 160 is potted into the fillister 111 and entirely covers the circuit element 150, baking or putting aside at room temperature can harden the first resin material 160. Practically, the step of hardening the potted first resin material 160 is in accordance with the kind of the first resin material 160 and the selected formulations (e.g. single liquid or two-component liquid that contain hardener). Because the first resin material 160 entirely covers the circuit element 150, the pollutions such as moisture, salt, and dust can be isolated, and the impacts caused by the vibrations of the circuit element 150 can be absorbed so as to lengthen the life of the circuit element 150. Besides, because the first resin material 160 and the chassis 110 are combined to each other, the entire mechanical strength of the chassis 110 can be improved.

Practically, the first resin material 160 can be silicon resin, epoxy resin, or polyurethane rubber. However, the first resin material 160 is not limited to the foregoing materials, and other materials that have good dielectric properties (e.g. the dielectric strength is larger than about 5 kV/mm), low thermal expansion coefficients, and/or small variations of stress (e.g. the linear expansion per unit K is smaller than about 0.01) can be applied in the invention.

The second resin material 170 of the embodiment is formed on the part of the stator assembly 120 where is not joined with the chassis 110 by conformal coating. Specifically, the conformal coating of the second resin material 170 is forming a thin layer on the surface to be coated in accordance with the contours of the surface (i.e. the surface of the stator assembly 120 where is not joined with the chassis 110). Practically, the second resin material 170 can be formed on the surface of the stator assembly 120 where is not joined with the chassis 110 by dipping, spraying, brushing, flow coating, or coating. Because the second resin material 170 forms a thin layer on the surface of the stator assembly 120, every component of the stator assembly 120 will be protected without being influenced by moisture and contaminants under the circumstances that without affecting original electrical characteristics and the rotational function of the motor 100. Therefore, the problems of declining quality caused by the eroded solder joints and metal parts in the stator assembly 120 can be avoided.

Practically, the second resin material 170 can be acrylic, epoxy resin, or urethane. However, the second resin material 170 is not limited to the foregoing materials, and other materials that have good performance of isolating water and oxygen and/or good dielectric properties (e.g. the dielectric strength is larger than about 5 kV/mm) can be applied in the invention.

Moreover, the motor 100 of the embodiment further includes a shaft 140 and a rotor assembly 130. The shaft 140 passes through the stator assembly 120 and is operatively connected to the chassis 110. The fillister 111 of the chassis 110 symmetrically configured relative to the shaft 140. As shown in FIG. 1, the fillister 111 is shown to be symmetrically located at two sides of the shaft 140. Practically, the fillister 111 is a continuous and round trough and is configured to surround the shaft 140. The rotor assembly 130 is pivotally sleeved to the stator assembly 120 via the shaft 140, so as to make the rotor assembly 130 to pivotally rotate relative to the stator assembly 120.

Besides, the chassis 110 of the embodiment has an outer round wall 112. The outer round wall 112 defines the fillister 111, and the outer round wall 112 has a round wall height B1 along the axial direction A of the shaft 140. The exposure surface of the first resin material 160 must be high enough to cover the circuit element 150, but must not be too high to influence the stator assembly 120 and the rotor assembly 130. Therefore; the potted and hardened first resin material 160 has a surface height B2 along the axial direction A of the shaft 140, and the round wall height B1 is larger than or equal to the surface height B2 of the first resin material 160. So, the chassis 110 can be used to accommodate the first resin material 160 that has the surface height B2.

The rotor assembly 130 includes a hub 131 and a rotor frame wall 133. The rotor assembly 130 is connected to the shaft 140 via the hub 131. The rotor frame wall 133 is located on the hub 131 and surrounds the stator assembly 120. In the embodiment, the round wall height B1 is larger than the surface height B2, as shown in FIG. 1. The outer round wall 112 is extended from the surface of the first resin material 160 along the axial direction A toward the rotor assembly 130, so that the rotor frame wall 133 and the outer round wall 112 are partially overlapped along the axial direction A of the shaft 140. Because the rotor frame wall 133 and the outer round wall 112 are partially overlapped, impurities such as external particles and dusts will be prevented from entering the motor 100 via the gap between the rotor assembly 130 and the chassis 110, so as to ensure the stability of operating and the quality of the motor 100.

On the other hand, the stator assembly 120 includes a plurality of silicon steel sheets 121 and a plurality of coils 122. The silicon steel sheets 121 and the coils 122 are disposed around the shaft 140. The coils 122 are electrically connected to the circuit element 150 for electrical current to flow through. In the embodiment, the circuit element 150 includes a circuit board 151 and a plurality of electronic components (not shown in figures). The electronic components are disposed on the circuit board 151, and the first resin material 160 covers the circuit board 151 and the electronic components thereon. The coils 122 are electrically connected to the circuit board 151. The rotor assembly 130 includes a plurality of magnetic elements 132 disposed on the hub 131, and the rotor assembly 130 surrounds the stator assembly 120. The rotor frame wall 133 surrounds the magnetic elements 132. When the current flows through the coils 122, the flux linkage generated between the silicon steel sheets 121 and the magnetic elements 132 of the rotor assembly 130 will make the rotor assembly 130 to rotate.

Figure 2:
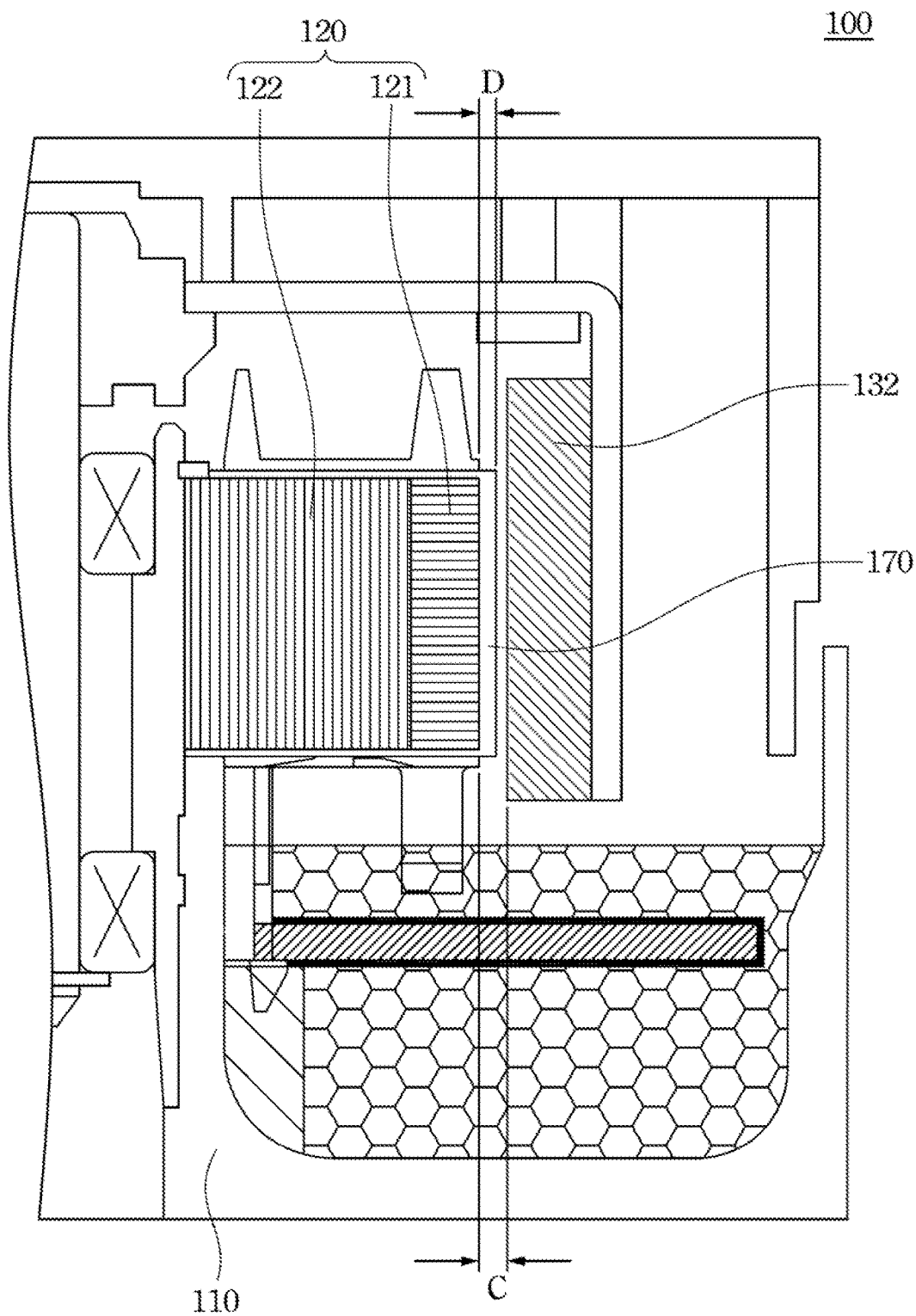
FIG. 2 is an enlarged view showing the silicon steel sheets and the magnetic elements in FIG. 1.

Please refer to FIG. 2, which illustrates an enlarged view showing the silicon steel sheets and the magnetic elements in FIG. 1. A clearance C is between the silicon steel sheets 121 and the magnetic elements 132. The clearance C is larger than or equal to 50 μm, so that the phenomenon of interference between the rotor assembly 130 relative to the stator assembly 120 can be avoided. The second resin material 170 covers the part of the stator assembly 120 where is not joined with the chassis 110, and the covered surface is up to a thickness D. That is to say, the second resin material 170 covers the surfaces of the silicon steel sheets 121 and the coils 122 for the thickness D. The thickness D is smaller than the clearance C, so the second resin material 170 that is coated on the surface of the stator assembly 120 will not influence the original electrical characteristics and the rotational function of the motor 100. On the other hand, in an embodiment, the thickness D is larger than or equal to 5 μm, and thus the second resin material 170 has enough thickness to protect the stator assembly 120.

Figure 3:
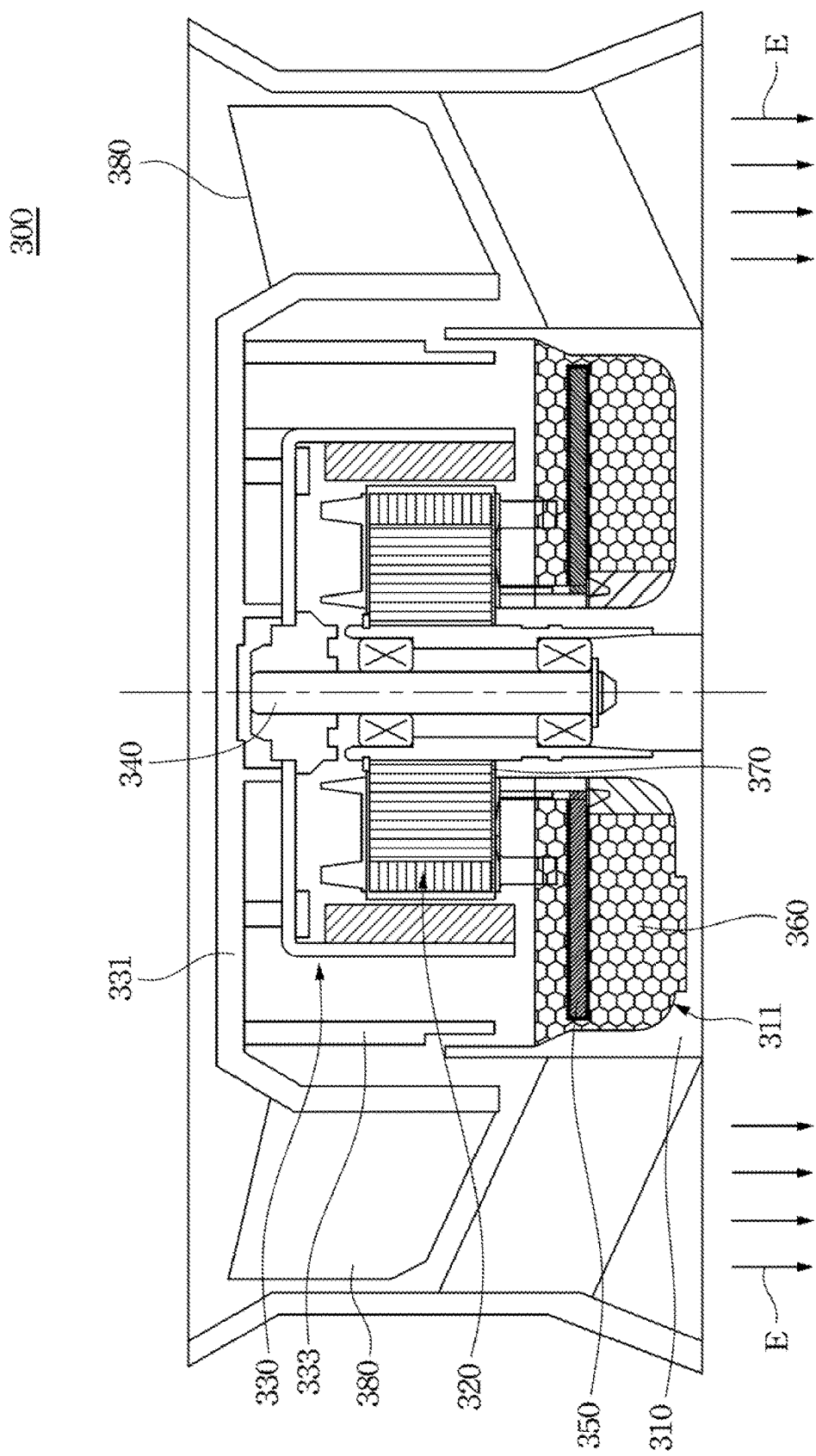
FIG. 3 is a sectional view showing a fan according to an embodiment of the invention.

Please refer to FIG. 3, which illustrates a sectional view showing a fan according to an embodiment of the invention. The fan 300 includes a chassis 310, a stator assembly 320, a circuit element 350, a shaft 340, a rotor assembly 330, a first resin material 360, and a second resin material 370. The chassis 310 has a fillister 311. The circuit element 350 is disposed in the fillister 311 and electrically connected to the stator assembly 320. The stator assembly 320 is disposed on the chassis 310 and located at a central area of the chassis 310. The shaft 340 passes through the stator assembly 320 and is operatically connected to the chassis 310. The rotor assembly 330 is pivotally sleeved to the stator assembly 320 via the shaft 340. The first resin material 360 is filled within the fillister 311 and covers the circuit element 350. The second resin material 370 covers a surface of the stator assembly 320 where is not joined with the chassis 310. The components are substantially similar to those in the foregoing motor 100 of the invention, so they will not be described redundantly here.

Furthermore, besides the components those are similar to those of the motor 100, the rotor assembly 330 of the fan 300 further includes a plurality of blades 380 that are disposed at the hub 331 of the rotor assembly 330 and surround the rotor frame wall 333. When the rotor assembly 330 rotates relative to the stator assembly 320, the blades 380 will generate an airflow E to drive air to flow through the fan 300.

In the fan 300 of the embodiment, the first resin material 360 is filled within the fillister 311 by potting and hardening. The first resin material 360 entirely covers the circuit element 350, the circuit element 350 can be protected without being influenced by the pollutions such as moisture, salt, and dust, so as to increase the life of the circuit element 350. Besides, the second resin material 370 is formed on the surface of the stator assembly 320 where is not joined with the chassis 310 by conformal coating. Therefore, the original electrical characteristics and the rotational function of the fan 300 will not be affected, and the problem of declining the quality of the stator assembly 320 caused by moisture and impurities can be avoided.

According to the motor and the fan using the same of the foregoing embodiments, the first resin material is utilized to cover the circuit element, so as to prevent the circuit element from oxidation and corrosion and improve the life of the circuit element. Moreover, the motor utilizes the second resin material to cover the surface of the stator assembly where is not joined with the chassis to prevent the problem of declining quality of the eroded stator assembly. Besides, because the rotor frame wall and the outer round wall are partially overlapped, impurities such as external particles and dusts will be prevented from entering the motor, so as to ensure the stability of operating and the quality of the motor.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A motor comprising:
 a chassis having a fillister;
 a stator assembly being disposed on the chassis and located at a central area of the chassis;
 a circuit element being disposed in the fillister;
 a first resin material being filled within the fillister and entirely covering all of exposed portions of the circuit element;
 a second resin material covering a part of the stator assembly, wherein the part is not joined with the chassis, wherein the second resin material is different from and spaced from the first resin material;
 a shaft passing through the stator assembly and being operatively connected to the chassis; and
 a rotor assembly being pivotally sleeved to the stator assembly via the shaft,
 wherein the chassis has an outer round wall so as to define the fillister, the outer round wall has a round wall height along an axial direction of the shaft, the first resin material has a surface height along the axial direction of the shaft, the round wall height is larger than or equal to the surface height, wherein the rotor assembly has a rotor frame wall surrounding the stator assembly, the rotor frame wall and the outer round wall are partially overlapped along a direction perpendicular to the axial direction of the shaft, wherein the rotor frame wall of the rotor assembly has an outermost boundary that is aligned with an outermost part of the first resin material along a direction parallel to the axial direction of the shaft, wherein the stator assembly comprises a plurality of silicon steel sheets, the rotor assembly comprises a plurality of magnetic elements, a clearance is between the silicon steel sheets and the magnetic elements, the second resin material covers a surface of the stator assembly with a thickness, the thickness is larger than or equal to 5 μm, the clearance is larger than or equal to 50 μm.

2. The motor of claim 1, wherein the stator assembly comprises a plurality of coils.

3. The motor of claim 1, wherein the first resin material is formed within the fillister.

4. The motor of claim 1, wherein the first resin material comprises silicon resin, epoxy resin, or polyurethane rubber.

5. The motor of claim 1, wherein the second resin material is formed on the surface of the stator assembly by conformal coating.

6. The motor of claim 1, wherein the second resin material comprises acrylic, epoxy resin, or urethane.

7. The motor of claim 1, wherein the circuit element comprises a circuit board, the circuit board is electrically connected to the stator assembly.

8. A motor comprising:
a chassis having a fillister;
a stator assembly being disposed on the chassis and located at a central area of the chassis;
a circuit element being disposed in the fillister;
a first resin material being filled within the fillister and entirely covering all of exposed portions of the circuit element;
a second resin material covering a part of the stator assembly, wherein the part is not joined with the chassis, wherein the second resin material is different from and spaced from the first resin material;
a shaft passing through the stator assembly and being operatively connected to the chassis; and
a rotor assembly being pivotally sleeved to the stator assembly via the shaft,
wherein the chassis has an outer round wall so as to define the fillister, the outer round wall has a round wall height along an axial direction of the shaft, the first resin material has a surface height along the axial direction of the shaft, the round wall height is larger than or equal to the surface height,
wherein the rotor assembly has a rotor frame wall surrounding the stator assembly, the rotor frame wall and the outer round wall are partially overlapped along a direction perpendicular to the axial direction of the shaft,
wherein the rotor frame wall of the rotor assembly has an outermost portion that is aligned with an outermost part of the first resin material along a direction parallel to the axial direction of the shaft.

* * * * *